W. Foster,
Cutting Shingles.

N° 2,853.  Patented Nov. 21, 1842.

UNITED STATES PATENT OFFICE.

WM. FOSTER, OF DETROIT, MICHIGAN.

MACHINE FOR CUTTING SHINGLES.

Specification of Letters Patent No. 2,853, dated November 21, 1842.

*To all whom it may concern:*

Be it known that I, WILLIAM FOSTER, of the city of Detroit, in the county of Wayne and State of Michigan, have made certain improvements in the manner of combining, regulating, and adjusting the knives and revolving table used in machines for the cutting of shingles; and I do hereby declare that the following is a full and exact description thereof.

There are several different machines for cutting shingles, in which the knives, or cutters, are attached to a table that is made to revolve, either horizontally, or vertically; the bolts, or blocks, from which the shingles are to be cut, being borne up against said knives by suitable devices. My improvement is applicable to all the shingle machines that operate upon this principle, and although in describing the manner in which I carry my improvement into effect, I shall describe an apparatus for holding the bolts, or blocks, so as to present them to the knives with the table revolving horizontally, it is to be distinctly understood that I do not make claim to this part as of my invention, but limit the same to the particular manner in which I combine the knives with said table, and regulate their action; and that I claim this improvement whether applied to the particular kind of machine herein described and represented, or to any other in which such a revolving table and cutters can be employed.

Figure 1:
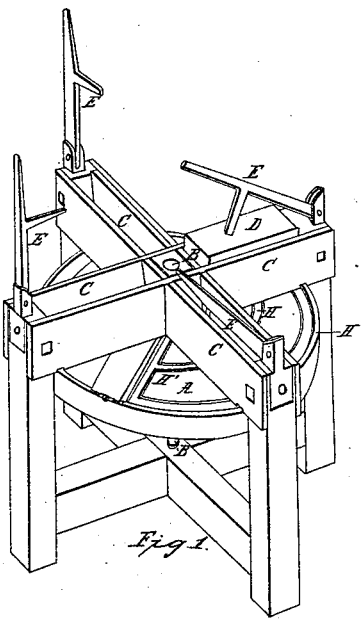

In the accompanying drawing, Figure 1, is a perspective view of a machine in which the table that carries the knives is made to revolve horizontally by the application of any adequate power.

A, is the table, which may be of cast-iron, and is sustained on an axis B, B. The bolts, or blocks, from which the shingles are to be cut, are, in this machine, to be placed in troughs C, C, as shown at D, and in addition to their own gravity they may be pressed down by levers E, E, which may be weighted, if necessary.

Figure 3:
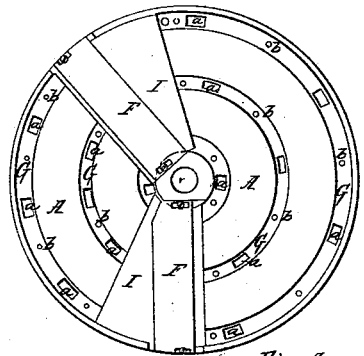
Figure 4:
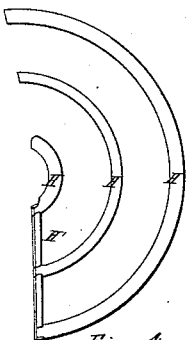
Figure 2:
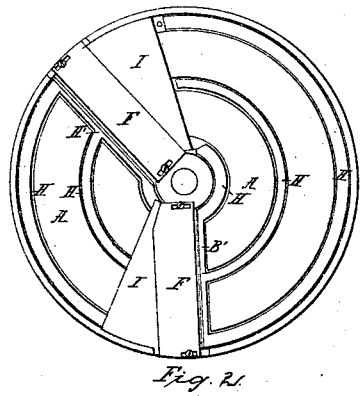

Fig. 2, is a top view of my improved table, with the knives, or cutters, and what I denominate the circular gages, in place. Fig. 3, is a similar view, with the circular gages removed; and Fig. 4 represents one of the circular gages as separated from the table.

F, F, are two knives, or cutters, which are affixed to the table by screws, in such position as that they shall not be each cutting a shingle at the same time, and that they shall cut in a direction diagonal to the bolt, as has been done in other machines for a like purpose. The upper surfaces of these knives are in the same horizontal plane, the heads and points of the shingles being regulated by the setting of the circular gages.

G, G, are grooves turned in the table, and H, H the circular gages, which are fitted to these grooves, and are held, and adjusted, in them by means of suitable set screws; $a$, $a$, are slots, or openings, through the table, and through which pins, made fast to the circular gages, by riveting or otherwise, pass, and receive washers, and nuts tapped on to their lower ends, by which the gages are held down; $b$, $b$, are the points of set screws, tapped through the table, and bearing against the under sides of the circular gages, by which means they may be set as required, in order to determine the thickness of the shingle. The curved parts of the circular gages are connected to a straight bar H', which serves to regulate the throats of the knives, or cutters, and which may be moved up toward their edges as they are diminished in width, by wearing and grinding. The backs of the knives are made to bear permanently against a stationary part of the table I, I.

The circular gages are made to rise, along their whole length, above the general surface A, A, of the table, and serve as ways upon which the bolts, or blocks, are sustained. The gages are, of course, to be so regulated as that the cutting of the knives shall be reversed, one of them cutting a head, and the other a point of a shingle toward the periphery, and toward the middle of the table.

Having thus fully described the nature of my improvement in the manner of combining, regulating, and adjusting the knives, and revolving table, used in machines for the cutting of shingles, what I claim therein as new, and desire to secure by Letters Patent, is—

The manner in which I regulate the throats of the knives, or cutters, and the thickness of the shingles, by means of circular gages H, H, let into grooves in the table, and the straight bar H′, to which they are connected; the circular gages being held in place, and adjusted, by set screws, and serving as ways to sustain the bolts, or blocks, the whole being formed, and operating, substantially as herein set forth.

WM. FOSTER.

Witnesses:
   THOS. P. JONES,
   EDWIN F. BRUNDAGE.